G. W. HOWE.
Separators for Thrashing-Machines.

No. 134,671.  Patented Jan. 7, 1873.

Witnesses:

Inventor,
G. W. Howe
by his Attys.
Hill & Ellsworth.

UNITED STATES PATENT OFFICE.

GEORGE W. HOWE, OF VINELAND, NEW JERSEY.

IMPROVEMENT IN SEPARATORS FOR THRASHING-MACHINES.

Specification forming part of Letters Patent No. 134,671, dated January 7, 1873.

*To all whom it may concern:*

Be it known that I, GEORGE W. HOWE, of Vineland, in the county of Cumberland and State of New Jersey, have invented a new and Improved Grain-Separator; and I do hereby declare the following to be a full and exact description of the same, reference being had to the accompanying drawing forming part of this specification, in which—

Figure 1:
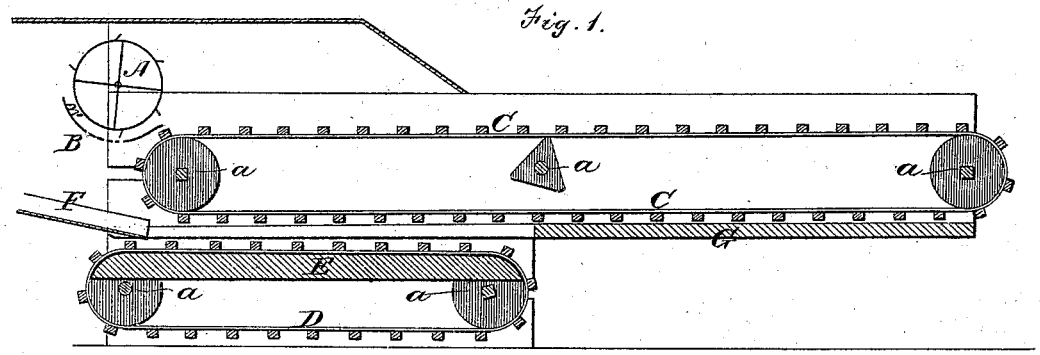
Figure 2:
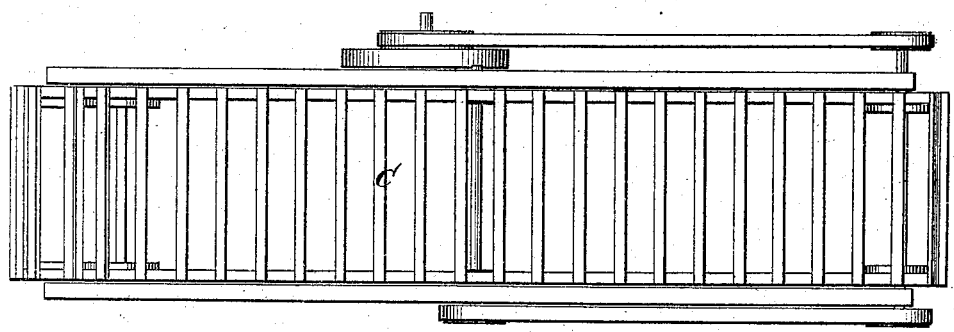
Figure 3:
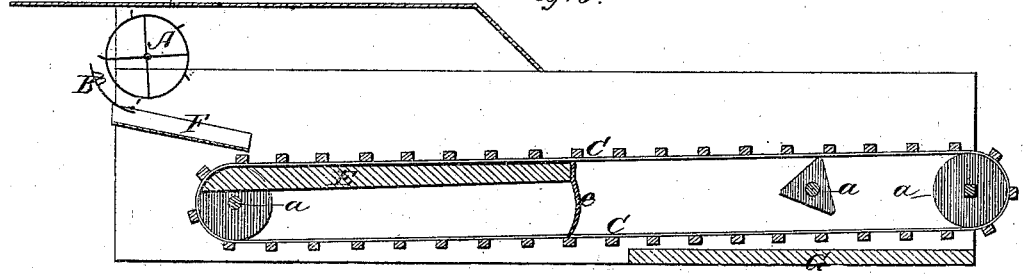

Figure 1 is a longitudinal vertical section of my apparatus; Fig. 2 is a top view of the same; and Fig. 3 is a longitudinal vertical section of a modification of the apparatus.

Similar letters of reference in the accompanying drawing denote the same parts.

This invention belongs to that class of grain-separators which convey away the straw that issues from the tails of thrashing-machines and also separate from the straw whatever grain may be left therein. The invention has for its object to improve the construction of machines of this class in such manner as to cause all the grain separated throughout the entire length of the straw-carrier to be conveyed to a common point of delivery to the fanning-mill. To this end the invention consists in the combination of endless carriers, one for conveying straw and the other for conveying grain, with platforms placed in such relation to the carriers as to receive both the grain that is separated from the straw at the cylinder of the thrashing-machine, and also that separated while it is being conveyed away from the thrashing-machine, and to deliver all the grain to the fanning-mill.

In the drawing, A is the cylinder, and B the slotted concave. C is the carrier that receives the straw after passing between the cylinder and concave, and D a carrier, placed beneath C, both these carriers being constructed and operated in the ordinary manner and placed in the usual inclined position. E is a platform placed within the carrier D, and receiving the grain that falls through the slotted concave B upon the spout F. The carrier D passes over the surface of the platform E and conveys the grain falling thereon upward to the fanning-mill, not shown in the drawing, but supposed to be located at the upper end of D. G is a platform placed beneath C and beyond E, at a sufficient interval from the latter for the purpose hereinafter described. Part of the grain carried away with the straw by C falls through upon E and is merged with the grain thereon. The remainder falls through upon G and is swept back by C to its lower end, whence it also falls into the fanning-mill through the aforesaid interval.

This arrangement is intended to be used where a large amount of motive power is available, and is preferable, in such case, to that shown in Fig. 3, which employs but one carrier, upon which both the straw and grain are delivered; the platform E being placed within said carrier in the same relative position to the platform G as in the former case, except that it is above instead of beneath it, the operation of both platforms being also the same. An apron, e, is attached to the upper end of E to scrape grain from the lower part of the carrier. The journals of my roller-shaft a are placed in simple slots or holes in the sides of the frame so as to do away with boxes.

What I claim as new is—

The combination of the carrier C with the carrier D placed beneath it, the platform G also placed beneath the carrier C and beyond the carrier D, and the platform E placed within the carrier E, all arranged as described.

GEORGE W. HOWE.

Witnesses:
N. K. ELLSWORTH,
MELVILLE CHURCH.